No. 805,294. PATENTED NOV. 21, 1905.
F. C. HOHN.
MACHINE FOR MAKING CEMENT BRICK AND THE LIKE.
APPLICATION FILED JUNE 12, 1905.

No. 805,294. PATENTED NOV. 21, 1905.
F. C. HOHN.
MACHINE FOR MAKING CEMENT BRICK AND THE LIKE.
APPLICATION FILED JUNE 12, 1905.

Witness
C. Hoerr.
N. Allmong

Inventor
Fred C Hohn
By V. H. Lockwood
Attorney

No. 805,294. PATENTED NOV. 21, 1905.
F. C. HOHN.
MACHINE FOR MAKING CEMENT BRICK AND THE LIKE.
APPLICATION FILED JUNE 12, 1905.

No. 805,294. PATENTED NOV. 21, 1905.
F. C. HOHN.
MACHINE FOR MAKING CEMENT BRICK AND THE LIKE.
APPLICATION FILED JUNE 12, 1905.

UNITED STATES PATENT OFFICE.

FRED C. HOHN, OF INDIANAPOLIS, INDIANA.

MACHINE FOR MAKING CEMENT BRICK AND THE LIKE.

No. 805,294.          Specification of Letters Patent.          Patented Nov. 21, 1905.

Application filed June 12, 1905. Serial No. 264,837.

*To all whom it may concern:*

Be it known that I, FRED C. HOHN, of Indianapolis, county of Marion, and State of Indiana, have invented a certain new and useful Machine for Making Cement Brick and the Like; and I do hereby declare that the following is a full, clear, and exact description thereof, reference being had to the accompanying drawings, in which like figures refer to like parts.

The object of this invention is to provide a practical and efficient machine for making bricks and blocks of cement and the like.

One feature of the machine relates to the means for supplying material to the molds, consisting of a stationary hopper and a receiver slidable beneath the hopper to receive a sufficient quantity of the cement to fill the molds and movable from a position beneath the hopper to a position over the molds, a false bottom being attached to said receiver that moves to a position beneath the hopper when the receiver is moved away from the hopper.

Another feature of the invention consists in means driven by the machine for tamping the material in the mold, said mechanism being provided with an individual tamper for each compartment in the mold.

Another feature of the invention consists in the mounting of a pair of molds so as to be invertible and revoluble on a shaft, the molds being oppositely located, so that when one mold is uppermost in position to receive cement from the receiver the other mold is in a downward position, where it is discharged of its contents. The idea is that while one mold is being filled the other mold is being discharged. In this connection the molds are made of sections that are separable, and mechanical means is provided for separating the sections and withdrawing the partitions forming the compartments thereof when the molds are in their lower or discharging position, so that the bricks will be deposited upon a pallet without forcing them from the mold, but, on the other hand, by merely taking from the bricks the surrounding parts and members of the mold. This is desirable because of the wet, soft, almost semifluid, condition at that stage of the operation.

Another feature of the invention consists in combining with the machine a mechanically elevated and lowered brick-receiver that is elevated to a position below a discharging-mold with a pallet upon it to receive the bricks and is afterward lowered, so that a workman may pick up the pallet loaded with bricks and carry it to a drier or drying place. In this connection there is combined with the means for opening the compartments means for temporarily holding the pallet. After the molds in their uppermost position are filled with cement a pallet is laid upon them and is mechanically held in position until said set of molds is revolved to its lowermost position and the brick-receiver moved upward against said pallet, and then said pallet-holding means is actuated, so as to release the pallet and leave it lying on the receiver.

These and the various other features of this invention will be understood from the accompanying drawings and the following description and claims.

In the drawings of the machine, made for the purpose of illustrating the nature of my invention.

Figure 1:
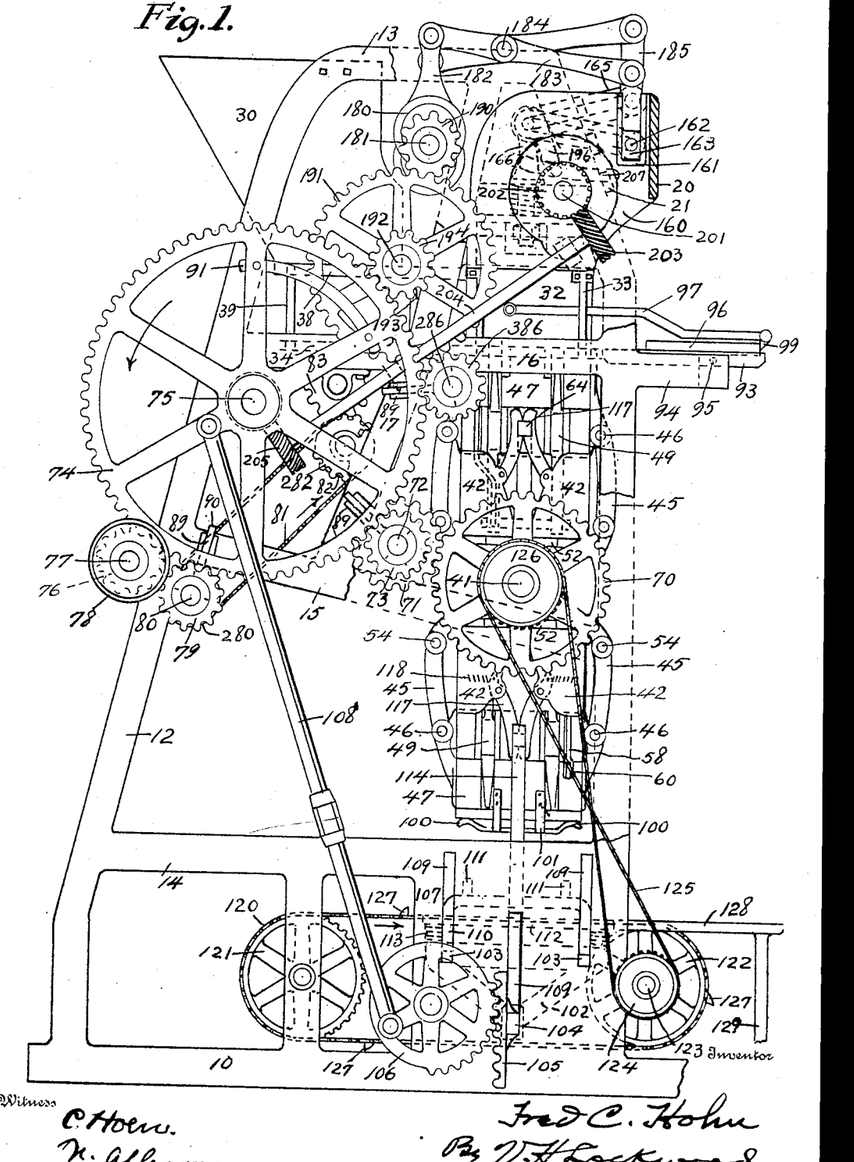
Figure 1 is an elevation of the left-hand side of the machine, showing the cement-receiver in position to fill the mold immediately before the tamping begins and the brick-receiver at the bottom is elevated, parts being broken away.

In the first place a suitable frame is made on which the movable parts of the machine are mounted. The sides of the frame, as seen in Fig. 1, have a base 10, with an upright 11 at the front and an upright 12 at the rear, that is somewhat inclined toward the front of the machine at the upper end, the upper ends of said uprights being connected by the portion marked 13. They are connected toward the lower end by a horizontal bar 14 and near the middle by an inclined bar 15 and toward the upper end by the bar 16, and there is an inclined substantially vertical bar 17 extending from the bar 15, bar 16, and to the top 13. The two sides of the frame are connected by the base-bar 18 (seen in Fig. 4) and the crossbar 19 toward the upper end and a plate 20, secured to the frame by bolts 21, and at the rear of the machine there are cross-bars similar to 18 and 19 at the front. A hopper 30 is secured by rigid connections 31 to the sides of the frame. The lower part of said hopper is contracted in both directions and is stationary. A cement-receiver 32 is slidably mounted under said hopper. It is in the form of a box, to each side of which arms 33 are secured, that extend out to the frame and slide in horizontal guideways 34, formed in the inner surface of the horizontal frame-bar 16, as appears in Fig. 4 and by dotted lines in Fig. 1. A rack 35 is secured to the under side of the outer ends of the arms 33, as shown in Fig. 3. There is a rack 35 on each side of the machine, which is engaged by a pinion 36 on a short spindle or shaft 37, mounted in the framework and on the outer ends of which the gear 386 is mounted. The receiver 32 is reciprocated from the position shown in Fig. 3 to the position shown in Fig. 2, and the reverse. The receiver is open on the upper side to receive cement that is deposited in the hopper 30, and when it is moved to the right toward the front from under said hopper a false bottom 38 closes the bottom of the hopper, said false bottom being a plate secured to or integral with the receiver 32 and having on each side an arm 39 similar to the arms 33 and similarly secured to the rack 35. The plate 38 is long enough to always insure its closing the bottom of the hopper during the various movements of the receiver 32, and thus preventing the escape of the cement from the hopper, excepting into said receiver.

Figure 4:
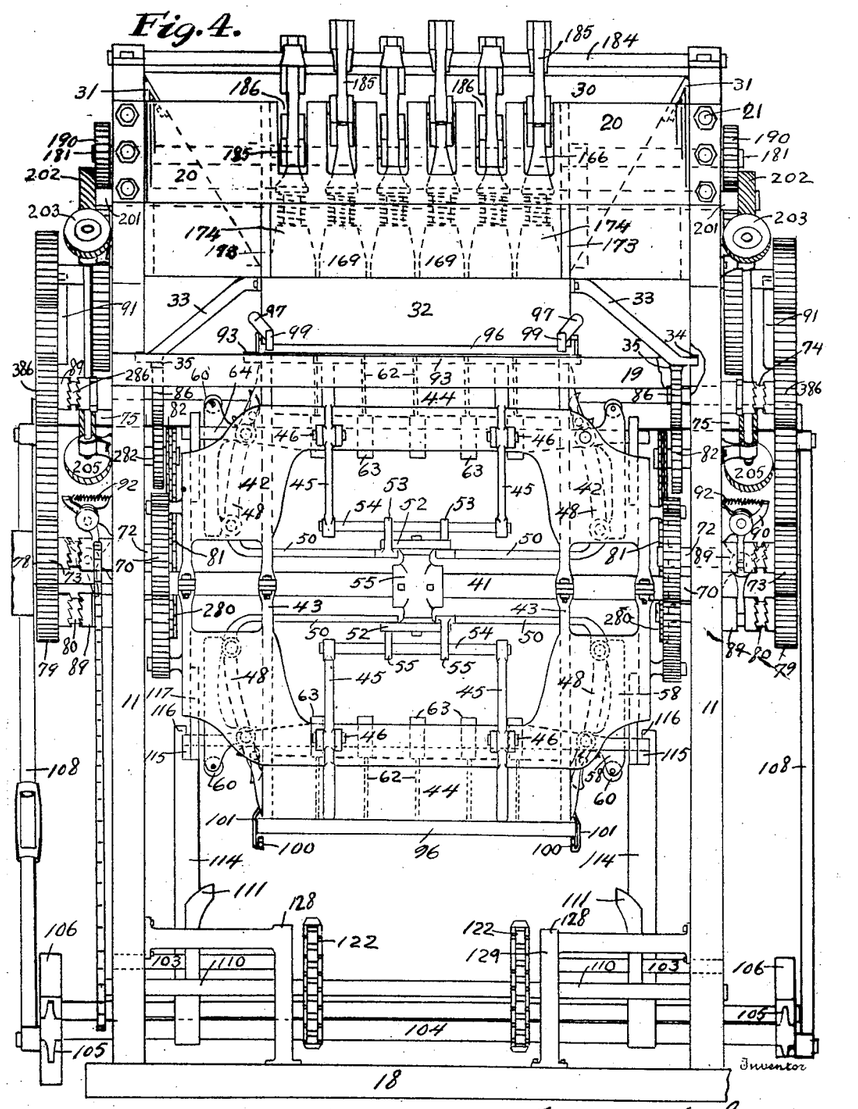
Fig. 4 is a front elevation of the machine with parts broken away in places, the machine being in the same stage of its operation as in Fig. 1.
Figure 5:
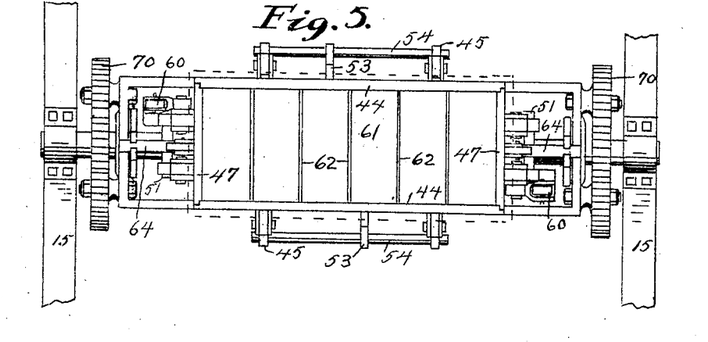
Fig. 5 is a top or plan view of one mold and the means for mounting and controlling it, the mold being closed.
Figure 6:
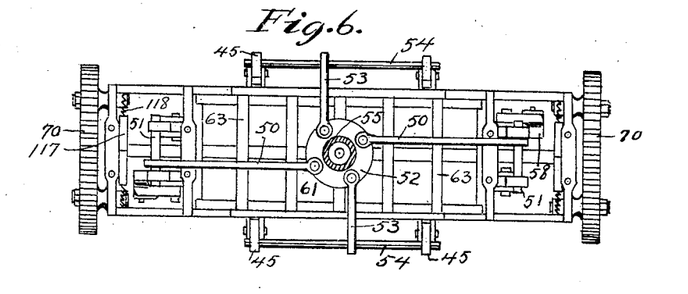
Fig. 6 is a bottom view of the same with the mold closed.

A horizontal shaft 41 is mounted in bearings 42 in the inclined bar 15 on each end frame. This shaft carries and operates the mold. To that end a pair of frame-plates 42 are rigidly secured by the arms 43 to the shaft 41 on each side of said shaft, so that, as appears in Figs. 1 and 4, there are two of these plates above and two below the shaft 41. They extend across the machine, as shown in Fig. 1. Aside from the revolving movement when the shaft 41 is rotated the plates 42 have no motion. Upon each of said plates 42 there is a mold side plate 44, pivotally mounted by means of the arms 45, pivoted at 46. This can be seen in Figs. 2 and 4. The plates 42 extend not only across the sides, as shown in Fig. 4, but also are turned across the ends, as shown in Fig. 1, where they are secured together, so that the shaft 41 and the four plates 42 and arms 43 make a solid frame that is revoluble. There are also end plates 47 to the mold, on which are secured the arms 48, that are fulcrumed at 49 to the end of the plates 42. Connecting-rods 50 are pivoted to the pivot-pin 51, that is pivotally connected with both of the end arms 48. Said rod 50 is at its inner end pivoted to the oscillatory plate 52, as seen in Fig. 6. There is also a rod 53 pivoted to said plate 52, and at its other end it is bent and pivoted to a pivot-rod 54, extending through the ends of the pair of side arms 45. The plate 52 is mounted oscillatory on the bearing 55 by means of the screw 56. The bearing 55 is secured rigidly to the middle of the shaft 41 and has a pair of opposite extensions on which said disks 52 are mounted.

Figure 7:
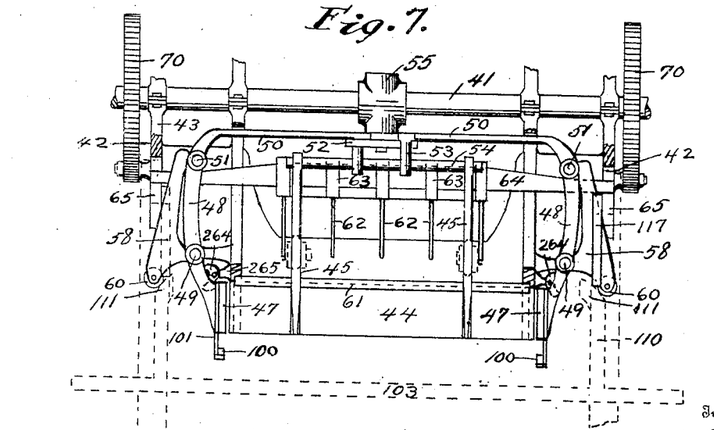
Fig. 7 is a side view of a mold in its downmost position with the sections thereof open and parts broken away, a part of the brick-receiver and the trip mechanism being shown in dotted lines.

At each end of the mold, as illustrated in Fig. 7, there is a lever 58, pivoted between its ends at 49 to the arm 48, with one end of said lever bearing inward against the end of one of the arms 48. The other end of said lever carries an antifriction roller or wheel 60, as seen in Fig. 7. When said lever 58 is actuated, as will hereinafter be explained, and is pushed into the position shown in Fig. 7, it will draw the ends of the mold outward by pressing inward at the joint 51, and when this occurs the plate 52 is slightly oscillated, so as to bring about a similar movement of the rod 54 on the side arms 45, and thus simultaneously move the four sides of the mold outward. The bottom 61 of the mold is secured stationary to the plates 42, and it is provided with transverse slots through which the partitions 62 are movable, so as to be withdrawn, as shown in Fig. 7. Said partition-plates 62 are secured to the cross-pieces 63, that are secured to or integral with the bar 64, which is vertically movable in the guideway 65 in the ends of the plate 42. The means for elevating the bar 64, and therefore the partitions, will appear later.

There is a spur-gear 70, which is secured on one end of the shaft 41 and meshes with the spur-gear 71, mounted on the bar 15. A shaft 72 carries a pinion 73 loosely, and that pinion meshes with a large gear 74 on the shaft 75, that runs through the machine. There is a similar wheel on each end. The wheel 74 is driven by the pinion 76 on the shaft 77, that at its opposite end carries the pulley 78, over which a belt runs from some suitable source of power. The gearing on both sides of the machine is the same. The large gear 74 meshes with and drives the pinion 79, mounted on the shaft 80, that carries the gear 280, which is connected by a sprocket-chain 81 with a pinion 82, mounted on a spindle having bearings in the frame on each side of the machine and carrying a wheel 282, meshing with the gear 83, and it in turn with the rack-bars 35. The gears just described move the cement-receiver back from over the mold to a position under the hopper. It is moved forward from the hopper to a point above the molds by the gear 86 on a spindle 286, that carries a gear 386, that meshes with the large gear 74. This gearing is also the same on both sides of the machine. Each of the gears or pinions 73, 79, and 86 is thrown into and out of operation with the shafts on which they are mounted by sliding clutch mechanisms 89, each of which is controlled by a lever 90, which is engaged by the bar 91, secured on the inside of the large gear 74. As said gear revolves in the direction of the arrow the bar 91 successively throws said gears 79, 73, and 386. The lever 90 is held in its outermost and inoperative position by an expansion-spring 92. Since the pinion 73 rotates the mold-shaft 41, it is seen that the sequence of operation of the parts caused by the large gear 74 is as follows: The pinion 79 first moves the receiver back under the hopper to obtain a charge of cement. Next the pinion 73 revolves the mold-shaft and moves the molds to the upper position. Next the pinion 386 moves the receiver filled with cement to a position over the mold. Cement is discharged from the receiver into the mold and tamped while the large gear 74 is completing its revolution.

The pallet-placing mechanism is as follows: A platform 93 extends across the machine transversely between the side frames and is pivoted in the arms 94 on the frame at the points 95, so that the inner edge will be tipped upward. The platform has a depression in its upper surface in which a pallet 96 is placed. After a mold has been filled and the cement-receiver is being removed from above the mold to a position under the hopper the bars 97, pivoted at 98 to the sides of the receiver, draw the pallet behind the receiver to a position over and upon the mold. The bars 97 do this by reason of the gravity-dogs 99, (see Figs. 9 and 11,) that drop down in front of the pallet, and when the receiver is moved inward slide the pallet over the mold. When the receiver moves outward, the dog 99 will ride over the pallet until it has reached the outer position, when the dog 99 will drop down in front of the pallet. When the pallet is thus moved in over a mold that has been filled with cement, it is held and clamped in position by a pair of spring-clamps 100 on the arms 101, secured to each end of the mold. These spring-clamps hold the pallet in place upon the mold while the same is being inverted or revolved from the upper position to the lower position, and thus hold the bricks in the mold. The pallet thus held and in position when the mold is in the lower position is shown in Figs. 1 and 4.

Figure 8:
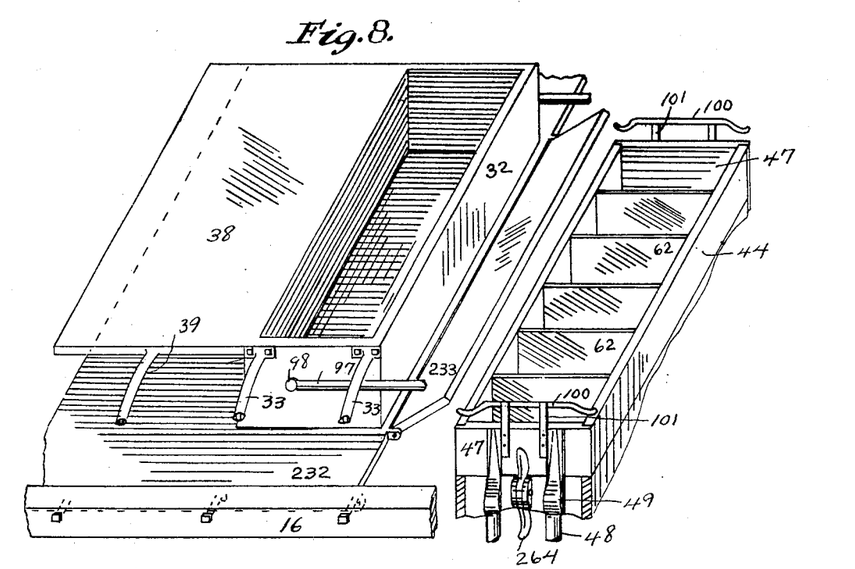
Fig. 8 is a perspective view of the upper part of the mold in its charging position and the cement-receiver and associate parts, parts being broken away, the receiver being in the position it occupies while under the hopper.
Figures 9, 10, 11, 12:
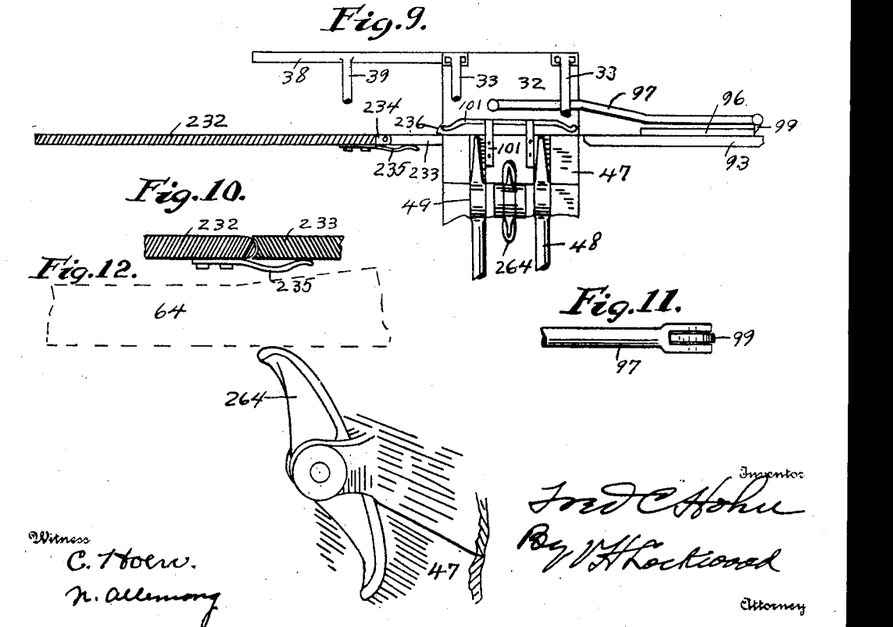
Fig. 9 is an end view of the mold shown in Fig. 8 with the cement-receiver over it, the platform that supports said receiver being in section longitudinally of the machine and parts being broken away.
Fig. 10 is a similar section through a portion of said platform and the adjacent portion of the movable platform when they are in the position shown in Fig. 9 for the purpose of illustrating the joint between them.
Fig. 11 is a plan view of the outer front end of one of the bars secured to the end of the cement-receiver, with a finger on the end thereof for moving the pallet in upon the mold.
Fig. 12 is a detail of the means for forcing the ends of the mold into a closing position.
Figure 13:
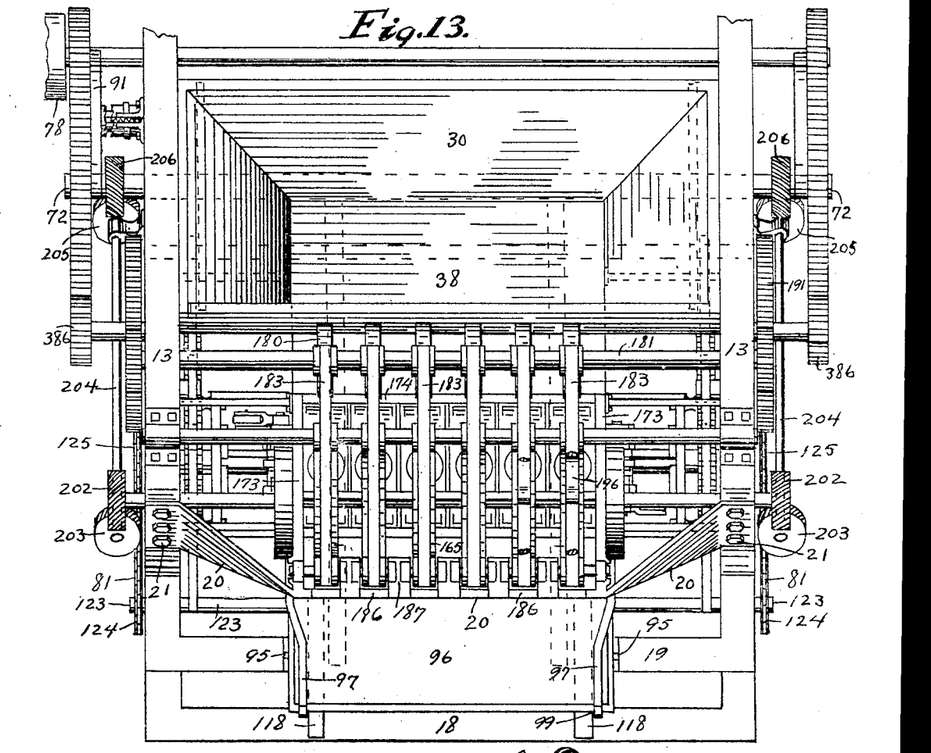
Fig. 13 is a plan view of the machine with parts broken away, as indicated.

The cement-receiver 32 is open both at the top and bottom, and the bottom slides on the platform 232, that is horizontal under the hopper and extends entirely across the machine and is secured to the frames at each side of the machine. The cement-receiver rests on this platform while it is under the hopper and the receiver is being supplied with cement. The forward edge of the platform is somewhat removed from the mold when the latter is in its upper and charging position. The space between the platform 232 and the mold when in such position is bridged by the plate 233, which is hinged at 234 to the platform 232. The adjacent meeting edges of the platform 232 and plate 233 are formed as shown in Fig. 10, one being convex and the other concave, so as to fit rather closely together to prevent cement from entering between them. A spring 235 is secured to the under side of the platform 232 and bears upward against the under side of the plate 233 to hold the latter in an inclined position when the cement-receiver 32 is under the hopper and not over the mold. The purpose of this inclined position of the plate 233 is to permit the revolution of the mold. When, however, the mold is in charging position and the cement-receiver 32 is moved toward the mold, the receiver slides from the platform 232 upon the plate 233 and depresses it from the position shown in Fig. 8 to the position shown in Figs. 9 and 10 in a horizontal position with the front edge of the plate 233 in touch with and flush with the upper part of the mold. The cement-receiver is movable still farther forward until it occupies its discharging position over the mold, as shown in Fig. 9, and while in that position a lug 236 on the receiver holds the plate 233 down, so that upon the return movement of the cement-receiver after its contents have been discharged the receiver will slide over the plate 233 back to the platform, and after it has thus been moved upon the platform the spring 235 will throw the plate 233 upward into the inclined position, so that the mold may be revolved, as has been explained.

Figure 2:
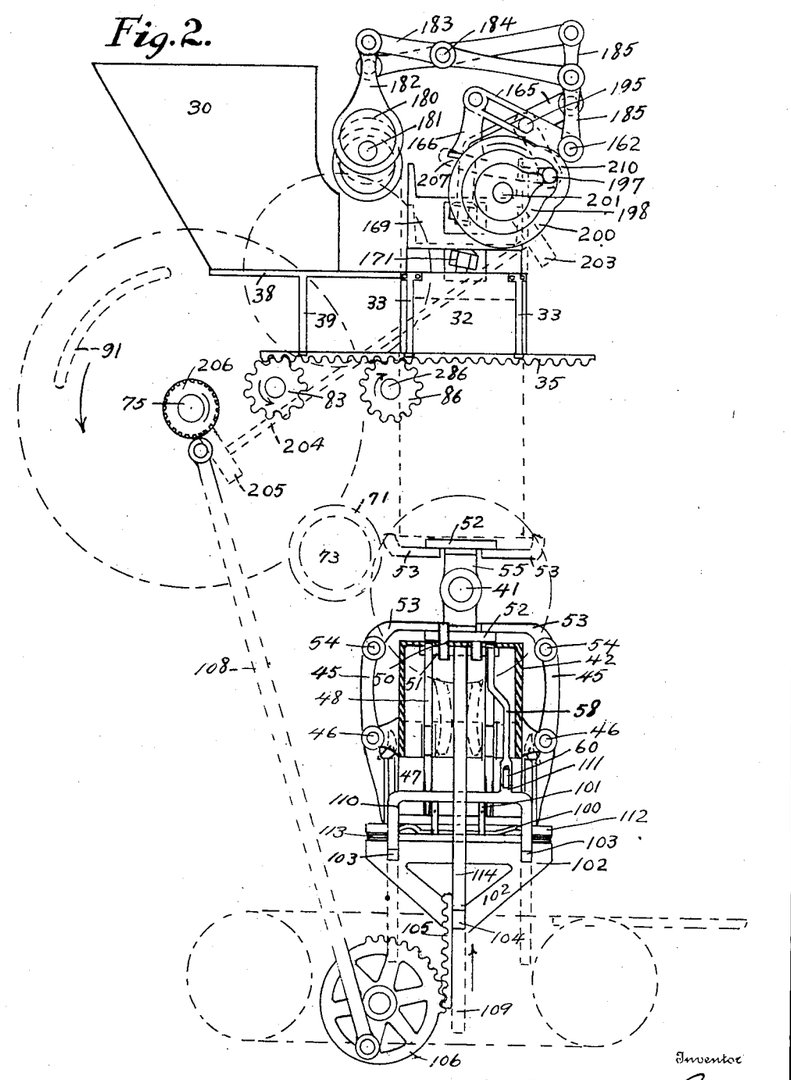
Fig. 2 is the same view with many parts omitted, showing the operation somewhat further advanced while the tamping is going on and the brick-receiver at the bottom is elevated.
Figure 3:
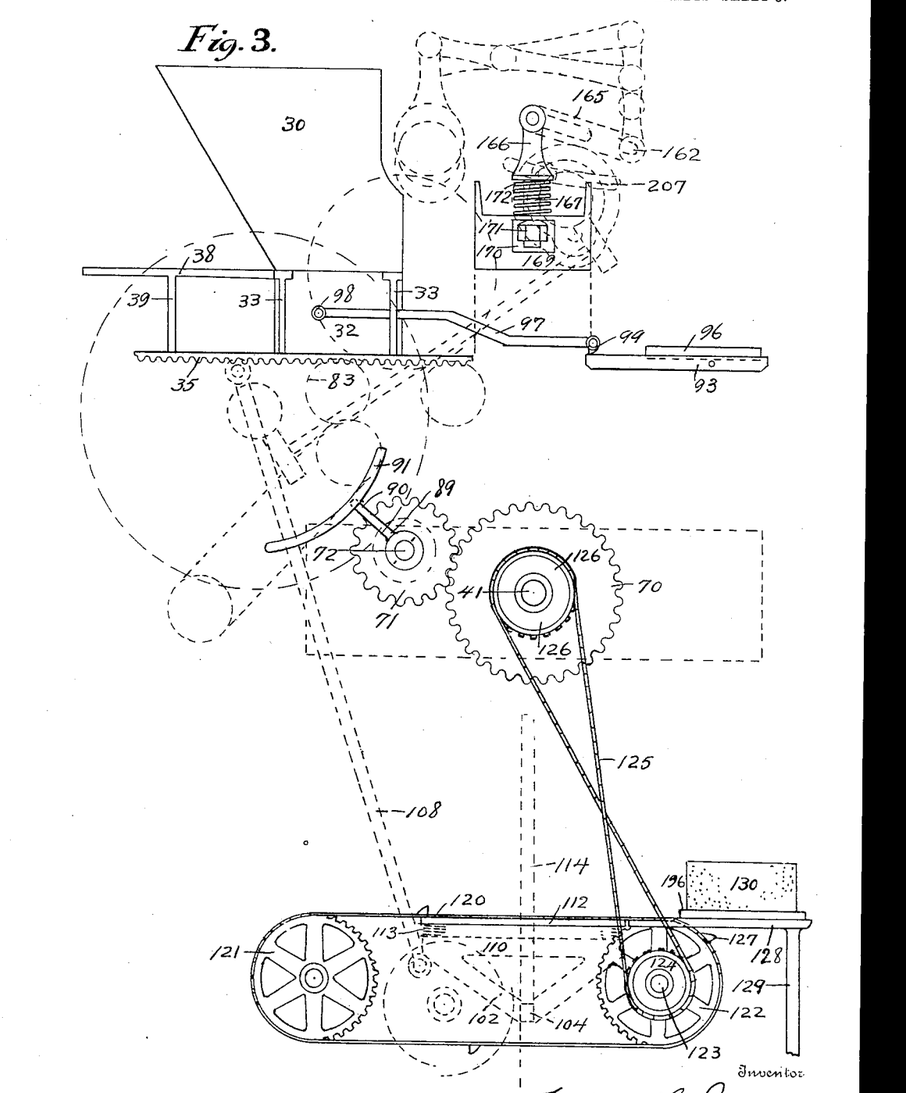
Fig. 3 is the same view as Fig. 2 with some parts in dotted lines and some omitted, so as to show the machine still further operated, the tamping being completed, the cement-receiver being moved back under the hopper, the brick-receiver lowered, and the pallet with the bricks on it in position for removal of the bricks.

The brick-receiver that takes the brick from the mold consists of a vertically-slidable frame formed of triangular-shaped end pieces 102, as seen in Fig. 2, and the two cross-bars 103, secured to said end pieces, and the elevating-bar 104, to which said end pieces are secured. The frame is vertically movable by means of the rack 105, secured to said bar 104, and the mutilated gear 106, mounted on the plate 107, that constitutes a part of the end frame of the machine. The wheel 106 is driven by a connecting-rod 108, that is pivoted eccentrically to the large gear 74. Said mutilated gear 106 merely oscillates and does not rotate for the purpose of elevating the brick-receiving frame. Said frame in its vertical movement is guided by the ends of the bars 104 and 103, which extend and move through vertical slots 109 in said plates 107. At each end of said vertically-movable receiving-frame there is means extending upward for tripping and controlling the operation of the means for closing and opening and manipulating the various parts of the mold. Thus at each end there is a bar 110, secured to and extending upward from the bars 103, and at 111 there is a little curved projection with a beveled top in position, as the brick-receiving frame is moved upward, to engage the roller 60 on the lower end of the lever 58, secured to the ends of the mold. The effect is that when the brick-receiving frame is moved upward, as shown in Figs. 2 and 7, said trip projection 111 pushes the lower end of the lever 58 outward, and this draws the end plates of the mold 74 outward, and the upper end of said lever 58 pushes inward on the rod 50, thereby turning the disk 52 and through the parts 53, 54, and 45 spreads or moves outward the sides 44 of the mold. At the same time when the ends 47 of the mold are moved outward the spring-clamps 100 are likewise moved outward from under the pallet 96, so that said pallet, with the bricks thereon, is left resting at each end upon pallet-receiving bars 112, that are supported by springs 113 on the end pieces 102 of the brick-receiving frame, as appears in Fig. 2. At the same time the partitions 62 of the mold are elevated to the position shown in Fig. 7 by the bars 114, that at each end of the brick-receiver are secured to and extend upward from the cross-bar 104. The upper ends of the bars 114, as seen in Fig. 4, have notches leaving shoulders 115 below and hook-shaped projections 116 above. As the mold revolves, the ends of the bars 64 pass into the notches in the upper ends of the bars 114, as shown in Fig. 4, and under the hooked projection 116. The upward movement of the brick-receiving frame from the position shown in Fig. 4 to that shown in Fig. 7 causes the bars 114 to elevate the cross-bar 64, to which the partitions 62 are secured, and thus to withdraw said partitions from between the cement bricks. Before this vertical movement of the partition-holding bar 64 by the upwardly-moving bars 114 it is necessary for the shoulder 115 on said bars 114 to spread the two arms 117, which are pivoted to the ends of the castings 42 and held by the spring 118, so that they will be pressed toward each other, as seen in the middle of Fig. 1. In their engaging faces the arms 117 have notches that coöperate to hold the bar 64 from movement, and they hold said partition-holding bar in position when the mold is upward, and when it is in its downward position until the shoulders 115 on the bars 114 in their upward movement crowd between the divergent ends of the arms 117 and separate them sufficiently to permit the cross-bar 64 to be pushed upward by said bars 114, as has just been described. During the closing or coming together of the parts of the mold after the bricks have been discharged the downward movement of the bar 64, that carries the partitions, engages the upper end of the trip 264, and by reason of the crescent form of the trip 264 such pressure on its upper end causes its lower end to press inward against the hinged end of the mold, so as to tightly close the same and also to hold or clamp the catches 100 in proper position to engage the pallet when it is being moved in upon the mold and the latter is in its upper or charging position. After the partitions 62 have been elevated from between the bricks and the sides of the mold have been spread by the means heretofore described and the pallet with its burden of brick rests upon the bar 112 the further operation of the machine through the connecting-rod 108 will cause the downward movement of the brick-receiving frame, and when it reaches its lowest limit of movement, as shown in Figs. 1, 3, and 4, the pallet will be located immediately over the sprocket-chain 120, mounted on sprocket-wheels 121 and 122. There is one of these chains and a pair of sprocket-wheels at each end of the brick-receiving frame, said wheels being mounted in the end frames of the machine, as shown in Fig. 1. The wheels 122 are mounted on the shaft 123, and they are driven by the sprocket-wheel 124 on said shaft 123 and chain 125 and the sprocket-wheel 126 on the left-hand side of the machine on the shaft 41. Said horizontal chains 120 have lugs 127 extending upward, that engage the pallet and move it to the right, as appears in Figs. 1 and 3, upon the platform 128. Said platform has a support 129, and the pallet 96 has on it the bricks 130. Then the pallet, with its load of bricks, is removed to some suitable place for drying.

The tamping mechanism will now be described.

Figures 14, 15, 16:
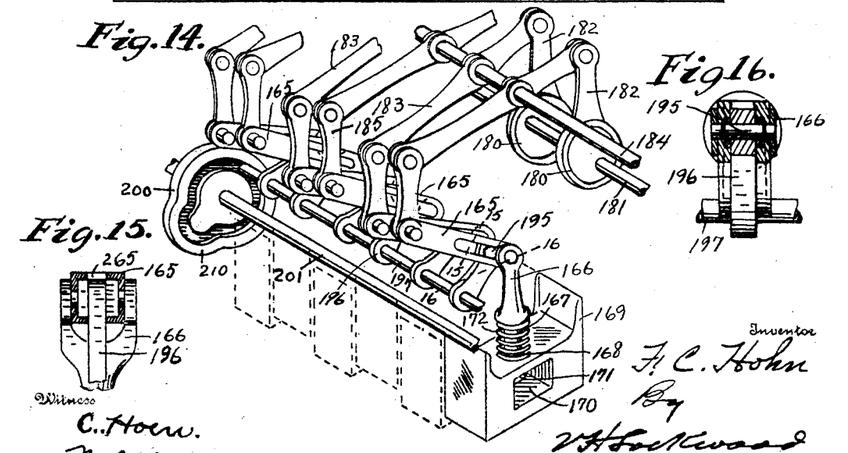
Fig. 14 is a perspective view of the tampers and means for actuating and controlling them, parts being broken away and parts in dotted lines.
Fig. 15 is a view from the line 15 15 of Fig. 14, parts being in section and parts broken away.
Fig. 16 is a detail, part being in plan and part being in section, on the line 16 16 of Fig. 14.

The plate 20, which extends across the upper part of the front of the machine, as seen in Fig. 4, has inwardly-extending plates 160. Said plate 20 is also cut away in several places at 186 in front, as shown in Fig. 4, and plates 187, as seen in Fig. 1, extend inward from said plate 20 at each side of said cut-out portions 186. The plates 187 are all provided with vertical bearing-grooves in which vertically-movable pins 162 of the arms 165 are mounted. Said arms 165 are pivoted at their outer ends to vertical stems 166, which are reduced at 167 and extend through an opening 168 in the top of the tamping-shoe 169, and in the hollow portion 170 of said block a nut 171 holds said block on the reduced portion 167 of said stem 166. A spring 172 on the reduced portion 167 of said stem holds said tamping-shoe downward yieldingly, the upper end of said spring bearing against the shoulder or widened portion of said stem 166, as appears in Fig. 3. There is a tamping-shoe 169 and supporting mechanism, as described, for each compartment of the mold. Six are shown in this case, and the bottoms of the tamping-blocks are of the same dimensions as the compartment and adapted to enter the same and tamp the cement therein. The vertical movement of said tamping-blocks is guided by a box-like arrangement secured above the mold and consisting of vertical end boards 173 and side portions 174. This box-like arrangement is fastened to the inner surface of the plate 20, that extends across the front part of the machine near the top, and the lower edge of said box-like arrangement extends downward immediately over the cement-receiver when the latter is moved into position over the molds. The tamping is caused by the eccentrics 180, one for each tamping-shoe and mounted on the shaft 181, extending from one side to the other of the frame. In each eccentric there is an eccentric-arm 182, that at its upper end is pivoted to the lever 183, which is fulcrumed between its ends to the rod 184, mounted in the framework. The outer ends of the levers 183 are pivoted to bars 185, which at their lower ends are pivoted to the arms 165. The form of the arms 165 is shown in Figs. 14, 15, and 16 and consists of two side bars brought together so as to have longitudinal slots 265 along their upper and lower ends, and the pins 195 in the upper ends of the arms 196 operate loosely in said slots. The shaft 181 is driven by means of a pinion 190, secured thereon, and it in turn by the gears 191, which are mounted on the shaft 192, carried in bearings 193 on the bars 17 of the frame. Said shaft 192 is actuated by a pinion 194, that meshes with the large wheel 74. In order to elevate and hold said tamping-shoes out of operation and above the cement-receiver when it is being moved into and out of position, each arm 165 is slotted in its sides at one end, and through the slots a pin 195 extends, that is secured to the bar 196, which is pivoted at its lower end to the rod 197, that extends transversely nearly through the machine. Each end of the rod extends into a groove 198 in the cam 200, that is mounted on the shaft 201, said shaft being mounted in bearings secured to the upper part of the front bars 11 of the main frame. There is a cam 200 on each side of the machine. The shaft 201 is driven by a spiral gear 202, secured to it outside of the frame of the machine and meshing with the spiral gear 203 on the rod 204, that at its lower end has a spiral gear 205 engaging with a spiral gear 206, secured on the shaft 72 inside of the wheel 74, but outside of the frame. At each revolution of the cams the rod 197 will be oscillated substantially horizontally through the slots 207 in the plates 160, and during such movement of the rod 197 the arms 196 will elevate all the tamping-shoes, the only time when the tamping-shoes are all elevated. The larger portion of the groove 198 is circular, and while the ends of the rod 197 are being moved through the circular portions of the groove 198 the rod 197 will not be moved and the tamping will proceed; but when the point 210 of the cam pushes the rod 197 inward it will, through the bars 196, elevate all the tamping-shoes above the cement-receiver 32.

What I claim as my invention, and desire to secure by Letters Patent, is—

1. In a brick-molding machine, the combination of a revoluble mold, a hopper for the material located to one side of the receiving position of the mold, a material-receiver movable from under the hopper to a position over the mold when it is in its receiving position, said receiver being open at the top and the bottom, a platform under the receiver when it is beneath the hopper, the edge of which next to the mold is located sufficiently far therefrom to permit the revolution of the mold, a plate hinged to the edge of the platform next to the hopper, means for supporting said plate in line with the platform and flush with the top edge of the hopper when in the receiving position, and means on the receiver for holding said plate down when the receiver is over the mold.

2. In a brick-molding machine, the combination of a revoluble mold, a hopper for the material located to one side of the receiving position of the mold, a material-receiver movable from under the hopper to a position over the mold when it is in its receiving position, said receiver being open at the top and bottom, a platform under the receiver when it is beneath the hopper, the edge of which next to the mold is located sufficiently far therefrom to permit the revolution of the mold, a plate hinged to the edge of the platform next to the hopper, means for supporting said plate in line with the platform and flush with the top edge of the hopper when in the receiving position, means on the receiver for holding said plate down when the receiver is over the mold, and a spring tending to elevate the edge of said plate adjacent the hopper to permit the revolution of the hopper.

3. In a brick-molding machine, the combination of a revoluble mold that in the revolutions thereof moves alternately to a material-receiving position and a brick-depositing position, a material-receiver movable to and from position over the mold when in the material-receiving position, a pallet, means controlled by the material-receiver for moving said pallet upon the mold during the movement of the material-receiver from the mold, and means connected with the mold for holding the pallet thereon.

4. In a brick-molding machine, a revoluble mold that in the revolutions thereof moves alternately to a material-receiving position and a brick-depositing position, a material-receiver movable to and from position over the mold when in the material-receiving position, a platform on a level with the top of the mold, a pallet adapted to rest thereon, arms secured to the material-receiver that engage said pallet so that as the material-receiver moves from the mold it will draw the pallet upon the mold, and means connected with the mold for holding the pallet thereon.

5. In a brick-molding machine, the combination of an invertible mold, means for charging it in its upright position with material, a pallet, means movable with the mold for holding the pallet upon said mold, means for releasing said pallet-holding means when the mold is inverted, and means for receiving and removing the pallet with the bricks thereon when the pallet is released.

6. In a brick-molding machine, the combination of an invertible mold, a pallet connected with said mold and below the brick, means for receiving and removing the pallet with the bricks thereon, and means for releasing said pallet from said mold so it will be deposited on said receiving and removing means.

7. In a brick-molding machine, the combination of an invertible mold, a pallet connected with said mold and situated below the brick when the mold is inverted, a brick-receiver vertically movable to the mold, and means connected with the brick-receiver for releasing the pallet from the mold as the receiver approaches the pallet.

8. In a brick-molding machine, the combination of a mold formed of spreadable parts, a brick-receiver movable under said mold, and means connected with the brick-receiver for spreading the parts of the mold as the receiver approaches the mold whereby the bricks will be discharged upon the brick-receiver.

9. In a brick-molding machine, the combination of a mold formed of spreadable sides and ends and vertically-movable partitions, a brick-receiver movable vertically to said mold, and means connected with said brick-receiver for spreading the sides and ends of the mold and elevating the partitions therein as the receiver approaches the mold.

10. In a brick-molding machine, the combination of an invertible mold having a slotted bottom, partitions vertically movable in said slotted bottom, a brick-receiver movable vertically to the mold when inverted, and means connected with said brick-receiver for elevating said partitions as the receiver approaches the mold.

11. In a brick-molding machine, the combination of an invertible mold formed of spreadable parts, a pallet, means connected with the parts of the mold for holding the pallet upon the mold so as to be below the brick when the mold is inverted, a brick-receiver movable vertically to the mold, and means connected with the brick-receiver for spreading the parts of the mold whereby the pallet will be released and the brick discharged by gravity with the pallet upon the brick-receiver.

12. In a brick-molding machine, the combination of a mold, a pallet, a horizontal conveyer that receives the pallet from the mold, a stationary platform adjacent the conveyer, and means on the conveyer for forcing the pallet upon said platform.

13. In a brick-molding machine, an invertible mold, a brick-receiver vertically movable to the mold to receive the brick therefrom, a stationary platform, means for horizontally moving the brick-receiver to discharge the brick on said platform, and a single means for operating all parts of said combination.

14. In a brick-molding machine, the combination of a plurality of vertically-revoluble molds radially opposite to each other, a stationary hopper, a material-receiver horizontally movable from a position under said hopper to a position over the uppermost of said molds, a pallet movable upon said uppermost mold, means for holding said pallet thereon, a brick-receiver vertically movable to the lower one of said molds, means on said brick-receiver for releasing the pallet, and a single means for operating said parts so that while one mold is being charged with material the other mold is being discharged.

15. In a brick-molding machine, the combination of a mold, a material-receiver movable into and out of position over said mold for charging it, a tamper operable through said receiver when over the mold, and means for holding said tamper elevated while the receiver is being moved.

16. In a brick-molding machine, the combination of a compartment-mold, a vertically-movable tamping-shoe for each compartment, means for operating the same, a material-receiver horizontally movable over the mold for charging the same and through which said tamping-shoes operate, means for holding said shoes elevated above the material-receiver while it is being moved into and out of position over the mold, and a single means for moving said receiver and controlling said tamping-shoe-holding means.

17. In a brick-molding machine, the combination of a compartment-mold, a material-receiver movable into and out of position over said mold for charging it, a tamping-shoe for each compartment operable through said receiver, a stationary guide above the receiver for said tamping-shoes, means for vertically operating said tamping-shoes, and means controlled by the movement of said receiver for holding the tamping-shoes elevated while the receiver is being moved.

18. In a brick-molding machine, the combination of a plurality of vertically-revoluble molds radially opposite each other, a tamper that tamps the material in a mold when in its uppermost position, a brick-receiver vertically movable to the mold in its lower position for receiving the brick therefrom, and means for operating said parts so that one mold is being discharged while the other is being tamped.

In witness whereof I have hereunto affixed my signature in the presence of the witnesses herein named.

FRED C. HOHN.

Witnesses:
C. HOEN,
N. ALLEMONG.